(12) United States Patent
Scholl et al.

(10) Patent No.: US 10,726,563 B2
(45) Date of Patent: Jul. 28, 2020

(54) VISUAL ODOMETRY DEVICE FOR 3D VEHICLE MOTION ESTIMATION AND VISUAL ODOMETRY METHOD FOR 3D VEHICLE MOTION ESTIMATION

(71) Applicant: Intel Corporation, Santa Clara, CA (US)

(72) Inventors: Kay-Ulrich Scholl, Malsch (DE); Koba Natroshvili, Waldbronn (DE)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 16/022,797

(22) Filed: Jun. 29, 2018

(65) Prior Publication Data

US 2019/0050997 A1    Feb. 14, 2019

(51) Int. Cl.
*G06T 7/70* (2017.01)
*G05D 1/02* (2020.01)
(Continued)

(52) U.S. Cl.
CPC ............ *G06T 7/248* (2017.01); *G01C 21/165* (2013.01); *G01C 22/00* (2013.01); *G05D 1/0253* (2013.01); *G06T 7/74* (2017.01); *G05D 1/021* (2013.01); *G05D 2201/0213* (2013.01); *G06T 7/13* (2017.01); *G06T 2207/20164* (2013.01); *G06T 2207/30236* (2013.01); *G06T 2207/30248* (2013.01); *H04N 5/225* (2013.01)

(58) Field of Classification Search
CPC . G06T 7/248; G06T 7/74; G06T 2207/30236; G06T 2207/20164; G06T 2207/30248; G06T 7/13; G05D 1/0253; G05D 1/021; G05D 2201/0213; G01C 21/165; G01C 22/00; H04N 5/225; H04B 5/0043; H04B 7/0834; H04B 1/082; H04B 1/3822; H04W 4/38; H04W 12/009; H04W 84/18; H04W 4/046

See application file for complete search history.

(56) References Cited

U.S. PATENT DOCUMENTS

2013/0093852 A1* 4/2013 Ye .......................... A61H 3/061
                                                                348/46
2014/0037136 A1* 2/2014 Ramalingam ............. G06T 7/73
                                                                382/103
(Continued)

OTHER PUBLICATIONS

Dickmanns et al.; "Recursive 3-D Road and Relative Ego-State Recognition"; IEEE Transactions on pattern analysis and machine intelligence; Feb. 1992; pp. 199-213; vol. 14, No. 2.

(Continued)

*Primary Examiner* — Andrew Wendell
(74) *Attorney, Agent, or Firm* — Viering, Jentschura & Partner MBB

(57) ABSTRACT

A visual odometry device, including: an image sensor configured to provide a first image and a second image; a visual feature extractor configured to extract at least three visual features corresponding to each of the first image and the second image; and a position determiner, configured to determine a change of a position of the at least three visual features between the first image and the second image, and to determine a degree of translation of the visual odometry device based on the determined change of position.

20 Claims, 8 Drawing Sheets

(51) Int. Cl.
    *G06T 7/246*     (2017.01)
    *G06T 7/73*     (2017.01)
    *G01C 22/00*     (2006.01)
    *G01C 21/16*     (2006.01)
    *G06T 7/13*     (2017.01)
    *H04N 5/225*     (2006.01)

(56) References Cited

U.S. PATENT DOCUMENTS

2016/0005164 A1*   1/2016   Roumeliotis ........ G01C 21/165
    348/116
2018/0373264 A1*   12/2018   Madsen .................. G01S 19/45

OTHER PUBLICATIONS

Hu et al.; "Real-time Data Fusion on Tracking Camera Pose for Direct Visual Guidance"; IEEE Intelligent Vehicles Symposium; 2004; 6 pages.

Cremean et al.; "Model-Based Estimation of Off-Highway Road Geometry using Single-Axis LADAR and Inertial Sensing"; IEEE International Conference on Robotics and Automotion; May 2006; p. 1661-1666.

Brown et al.; "Kalman Filter Applications to the GPS and Other Navigation Systems"; Introduction to Random Signals and Applied Kalman Filtering; 1997; pp. 318-352, Chapter 9.

* cited by examiner

VISUAL ODOMETRY DEVICE FOR 3D VEHICLE MOTION ESTIMATION AND VISUAL ODOMETRY METHOD FOR 3D VEHICLE MOTION ESTIMATION

TECHNICAL FIELD

Various aspects of this disclosure relate generally to a visual odometry device for 3D Vehicle Motion Estimation and to a visual odometry method for 3D Vehicle Motion Estimation.

BACKGROUND

The precise motion estimation of automatic vehicles using visual sensors is very important since on one hand it contributes to the localization of the vehicles on Automatic Driving 3D maps contributing to the relation between the reality of the roads, route planning and the control of the vehicle; on the other hand, visual sensors provide good readings where other sensors may fail.

Structure from Motion provides an approach to motion estimation using visual sensors. In principle, the Structure from Motion approach requires the estimation of up to 6 parameters to perform the estimation of the autonomous vehicle movement, wherein 3 parameters are required to estimate for the rotation around the three coordinate axes of 3D spaces and 3 parameters for the translation along the coordinate axes. In practice, only 5 parameters may be sufficient because the translation can be estimated only with scaling factor.

Nevertheless, the estimation of five parameters may still be too expensive for autonomous vehicles from both the computational point of view and the estimation precision point of view.

SUMMARY

A visual odometry device, including: an image sensor configured to provide a first image and a second image; a visual feature extractor configured to extract at least three visual features corresponding to each of the first image and the second image; and a position determiner, configured to determine a change of a position of the at least three visual features between the first image and the second image, and to determine a degree of translation of the visual odometry device based on the determined change of position.

BRIEF DESCRIPTION OF THE DRAWINGS

In the drawings, like reference characters generally refer to the same parts throughout the different views. The drawings are not necessarily to scale; emphasis is instead generally being placed upon illustrating the principles of the disclosure. In the following description, various embodiments of the disclosure are described with reference to the following drawings, in which.

DESCRIPTION

Figure 1:
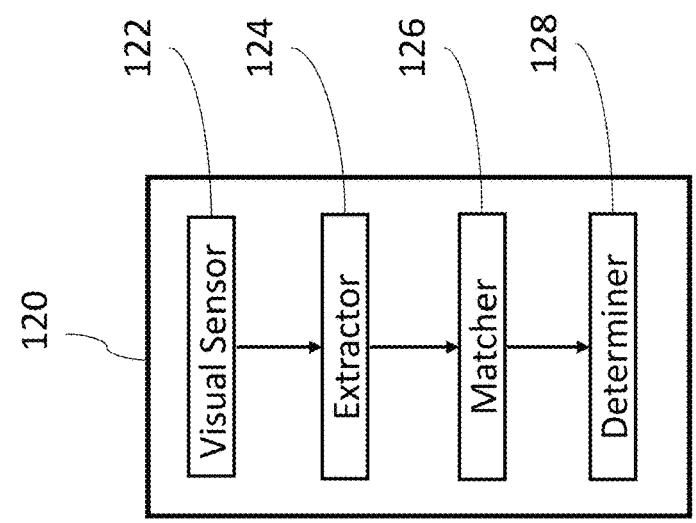
FIG. 1 shows an exemplary vehicle (e.g. an autonomous vehicle) containing a perception device, and a diagram showing the components of an exemplary perception device.
Figure 1:
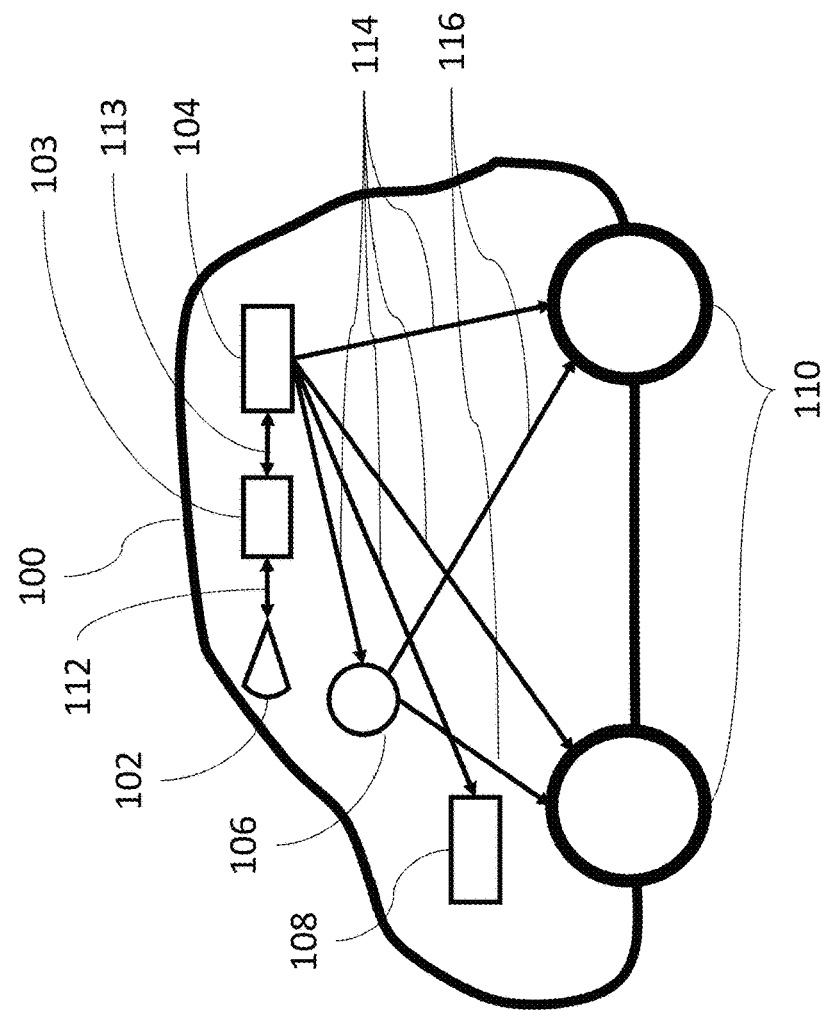

The following detailed description refers to the accompanying drawings that show, by way of illustration, specific details and embodiments in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any embodiment or design described herein as "exemplary" is not necessarily to be construed as preferred or advantageous over other embodiments or designs.

The precise motion estimation of automatic vehicles using visual sensors is very important since on one hand it contributes to the localization of the vehicles on Automatic Driving (AD) 3D maps contributing to the relation between the reality of the roads, route planning and the control of the vehicle; on the other hand, visual sensors provide good readings where other sensors may fail.

Visual odometry devices provide an approach to motion estimation using visual sensors and a class of algorithms named Structure from Motion. In principle, the Structure from Motion approach requires the estimation of up to 6 parameters to perform the estimation of the autonomous vehicle movement, wherein 3 parameters are required to estimate for the rotation around the three coordinate axes of 3D spaces and 3 parameters for the translation along the coordinate axes. In practice, only 5 parameters may be sufficient because the translation can be estimated only with scaling factor.

Nevertheless, the estimation of five parameters may still be too expensive for autonomous vehicles from both the computational point of view and the estimation precision point of view.

One solution proposed in this disclosure illustratively models the movements of the automatic vehicle with a reduced number of degrees of freedom. When the proposed model is implemented in a visual odometry device, only 3 parameters instead of 5 need to be estimated. The resulting visual odometry device may require less resources to estimate the movements of the vehicle while obtaining a higher accuracy of the estimate.

Whereas the description, the examples, and the figures refer to an Automatic Driving (AD) (e.g. Autonomous Driving) vehicle, it should be understood that examples of Automatic Driving vehicles may include automobiles, busses, mini busses, vans, tracks, mobile homes, vehicle trailers, motorcycles, bicycles, tricycles, moving robots, personal transporters; it should also be understood the visual odometry device disclosed applies to vehicles of any size and type.

In addition, it should be understood that the visual odometry device disclosed as well as the examples disclosed may be used in a wide range of applications including security cameras that may use the visual odometry device to monitor access to a given area, traffic lights that may use visual odometry device to monitor the traffic waiting at an intersection, smart digital signage for both advertisement and information purposes that may use tracking device to estimate the number of impressions or to derive the most relevant content to display, traffic congestion sensors that may use the visual odometry device to estimate the traffic in a given area, speedometers that may use the visual odometry device to compute the speed of vehicles in a given area.

FIG. 1 shows an exemplary vehicle (e.g. an automatic vehicle, e.g. an autonomous vehicle) 100 that includes a visual odometry device 102 for 3D Vehicle Motion Estimation, and a diagram 120 showing an exemplary visual odometry device for 3D Vehicle Motion Estimation which may be functionally equivalent to the visual odometry device 102. It should also be understood that the exemplary vehicle 100 may include various other components which are not described.

The vehicle 100 may be an automatic driving vehicle 100 (e.g. car), e.g. an autonomous driving vehicle (e.g. car), an autonomous drone, an autonomous plane or any other flying object, an autonomous bike, trike, or the like. As an alternative, the autonomous vehicle 100 may be any kind of robot or moving hardware agent. Furthermore, it is to be noted that the vehicle 100 does not necessarily need to be a fully autonomous vehicle, but can also be a partially autonomous vehicle or a vehicle in which implements the perception device as part of the driver assistance systems. Furthermore, the disclosure below may be relevant for any device requiring perception in a given area, such as surveillance devices which may monitor a specific location. As opposed to vehicles that constantly change position, such devices may be fixed in a specific position.

The exemplary automatic driving vehicle 100 may include a visual odometry device 102 for 3D Vehicle Motion Estimation to detect the movements of the vehicle, a localization device 103, an automotive controller 104 of the automatic driving vehicle 100, as well as various automotive components such as a steering module 106, a motor 108, and wheels 110 which may also include a braking system and a turning system neither of which are displayed.

In some embodiments, the visual odometry device 102 may be rigidly attached to the vehicle 100, pointing in the direction of motion of vehicle 100, therefore the computation of the movement of the vehicle may be reduced to a computation of the movement of the visual odometry device.

In some embodiments, the visual odometry device may be at an angle with respect to the direction of motion, therefore, in these embodiments, the movements of the vehicle 100 may need to be adjusted to account for the different position of the visual odometry device.

In some embodiments, the visual odometry device 102 may be moving dynamically as the vehicle 100 moves. In these embodiments, the computed change of position of the vehicle may need to be adjusted with respect to the change of position of the visual odometry device.

The exemplary visual odometry device 120 may include an image sensor 122 configured to provide a sequence of a plurality of images, wherein the images include at least one visual feature; a visual feature extractor 124 configured to extract a visual feature of the at least one visual feature from the plurality of images; a visual feature matcher 126 configured to match the extracted visual feature in at least two images of the sequence of plurality of images; a position determiner 128 configured to determine a degree of translation of the visual odometry device; wherein the determination of the degree of translation of the visual odometry device is based on a measure of change of position of at least 3 of the extracted visual features.

In some embodiments, the image sensor 122 may be a mono-camera.

In some embodiments, the image sensor 122 may include a plurality of cameras wherein some of these cameras may be mono-cameras, wherein each camera may point in a different direction.

In some embodiments, the visual odometry device may be distributed in the vehicle 100. In some exemplary embodiments, the image sensor 122 may be part of a sensor module, not displayed, that may also include a plurality of sensors including Lidar sensors, Radar sensors, as well as positioning sensors that may be implemented in relation to satellite-based positioning systems such as GPS, Galileo, GLONASS, Beidou or variants of these systems such as differential GPS, or other types of positioning systems technologies such as Cellular-based positioning systems. The sensors module may also include sensors of the movement of the vehicle such as odometry sensors including one or more Inertial Measurement Units (IMU) which may include sensors such as accelerometers, gyroscopes, and magnetometers. The sensor module may include a range of additional sensors monitoring the correct functioning of the vehicle, as well as other sensors that may be required by the vehicle. In some embodiments, the sensor module may be highly distributed within the vehicle, with sensors being placed in positions that maximize their effectiveness.

In the embodiment of vehicle 100 displayed in FIG. 1 the visual odometry device, 102, the localization device 103, and the automotive controller 104 are displayed as distinct components. In some embodiments, of vehicle 100 the three components 102, 103 and 104 may be integrated in different ways. In some embodiments, the visual odometry device, 102 may be integrated into the localization device 103; in other embodiments, 102, 103 and 104 may be a single device.

The automotive controller 104 of the exemplary vehicle 100 may be configured to control the automatic driving vehicle driving direction and speed, and in general to control the automotive components such as the steering module 106, the motor 108, and the wheels 110, the braking system and other systems that are included in the vehicle. The automotive controller 104 may be configured to fully or partially control the vehicle 100. Full control may indicate that the automotive controller 104 is configured to control the behavior of all other automotive components, and the human driver is passive. Partial control may indicate that the automotive controller 104 is configured to control only some automotive components, but not others which are under control of the driver. For example, the automotive controller 104 may be configured to control the speed, but not the steering of the vehicle 100 and other components. Such automotive controller 104 may be configured to exercise a level of control similar to a cruise control. In other cases, partial control may indicate that the automotive controller 104 is configured to control all automotive components, but may be configured to, only in some situations, for example, control the vehicle on the highway but not on other roads where the driver should take control; or that the automotive controller 104 may be configured to control all the automotive components only in low traffic situations, while in high traffic the driver should take control.

FIG. 1 also shows an exemplary connection scheme across the different components. Such connections may be implemented as a wired connection or a wireless connection. Any kind of communication protocol including vehicle bus networks such as Controller Area Network (CAN), Local Interconnected Network (LIN) bus, FlexRay, Media Oriented System Transport (MOST), and Automotive Ethernet, as well as cryptographic and non-cryptographic variations, may be used for a communication between two respective components. Furthermore, the interaction between the components may be implemented as cyclic broadcast or multicast communication or a remote function call or an API call across software modules or in any other way that allows transfer of information between components.

The connection 112 between the visual odometry device 102 and the localization device 103 may be configured to provide an exemplary information flow through which the visual odometry device 102 communicates to the localization device 103 information signaling the movements of vehicle 100.

The connection 113 between the localization device 103 and the automatic controller (e.g. autonomous controller) 104 may be configured to provide an exemplary information flow through which the localization device 103 communicates to the autonomous controller 104 information possibly signaling the localization of the vehicle 100.

Each one of the connections 114 couples the automotive controller 104 with the other components, such as the steering module 106, the motor 108, and the wheels 110, and the like. The connections 114 may be configured to provide information flow from the various automotive components: e.g. the steering module 106, the motor 108, and the wheels 110 to the automotive controller 104.

The steering module 106 may communicate through 116 to a turning system (not shown) of the wheels 110 to change a respective wheel angle with respect to the direction of the automatic driving vehicle 100 forcing the automatic driving vehicle 100 to change direction. In some embodiments, of the automatic driving vehicle 100, the steering module 106 may be configured to mechanically change the angle of the respective wheels 110 with respect to the direction of the automatic driving vehicle 100 forcing the automatic driving vehicle 100 to change direction. In other embodiments, the connectors 116 may be implemented as a communication connector. In other embodiments, the steering module 106 may be a component of a wheel's control system (not shown).

The components of the vehicle, and in particular the visual odometry device may be implemented by a non-transient computer readable medium storing a plurality of instructions implementing the methods required by those components. In the case of the perception device, the computer readable medium may store a plurality of instructions implementing a visual odometry to determine the changes of position of the vehicle 100 on a three-dimensional map.

The computer readable medium may include a plurality of processors and/or one or a plurality of controllers. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The computer readable medium may also be a virtualized device which is executed by one or more physical devices. In addition, the computer readable medium may be a network device residing in a cloud, or it may be configured to execute some functions in the cloud for example through remote API calls.

Figure 2:
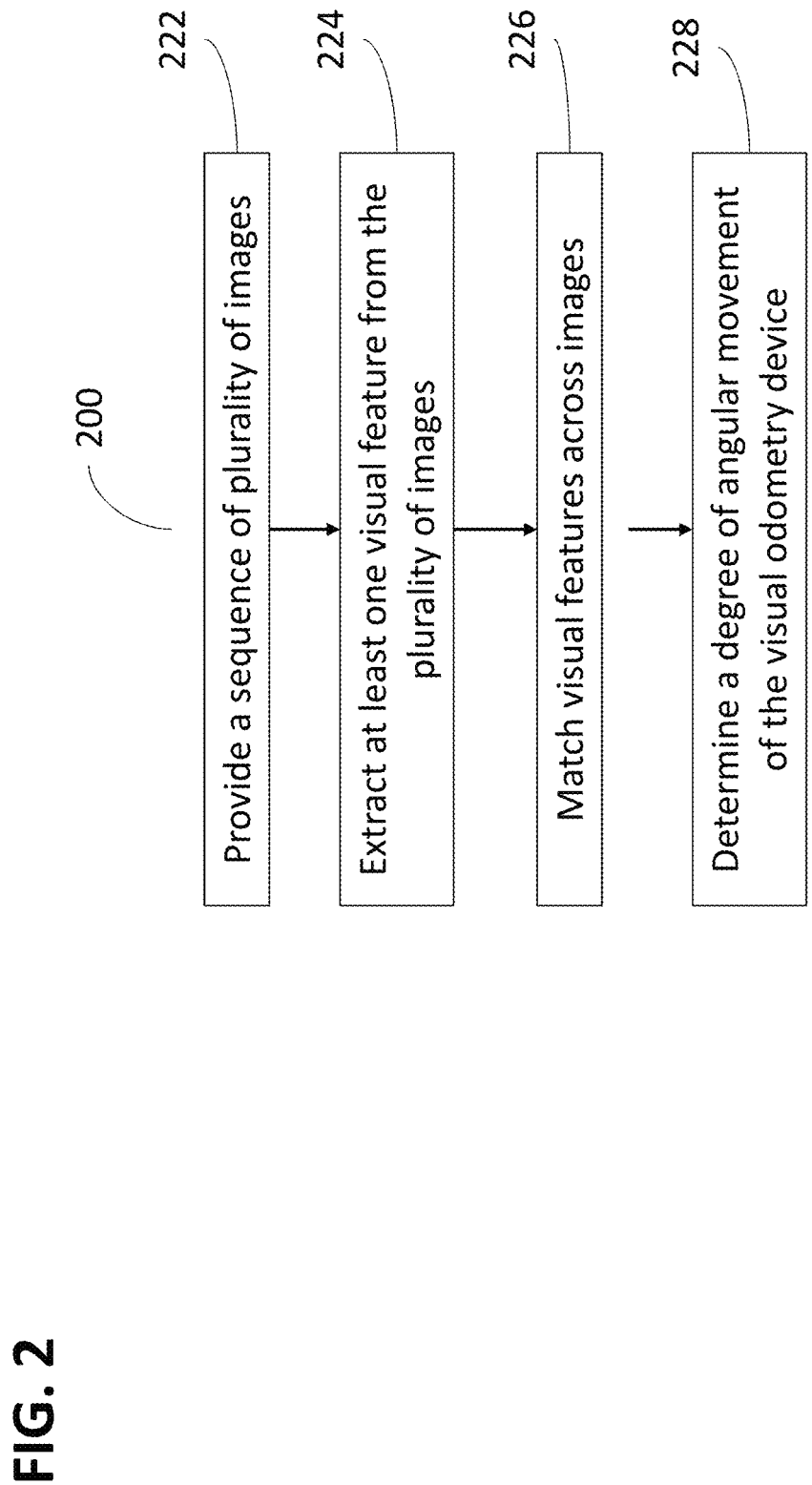
FIG. 2 shows a flow diagram describing a visual odometry method to compute the position changes of the vehicle.

FIG. 2 shows a flow diagram describing a visual odometry method 200 to compute the position changes of the vehicle 100.

In 222, a sequence of images may be provided. In some embodiments, the images may be taken from the image sensor 122. In some embodiments, the images are taken at regular time intervals.

In 224, at least one visual feature is extracted from one of the images provided in 222. The extraction process may include the automatic recognition of at least some visual features of the objects displayed in the images. Examples of visual features may include the rectangular shape of a building or the triangular shape of a roof, or just a corner of the roof. In some embodiments, entire objects may be recognized as visual features, such as for example street signs or statues or trees on the side of the road.

In 226, the matches of visual features across images are extracted. As an example, a first image taken in 222 may include the depiction of a roof, in 224 the left corner of the roof, as depicted in the first image, may be recognized as a first visual feature. Similarly, a second image taken in 222 may include the depiction of the same roof, in 224 the left corner of the roof, as depicted in the second image, may be recognized as a second visual feature. In 226, the first and second visual features may be matched since they refer to the same object although in different images.

In 228, the degree of translation of the visual odometry device is determined on the bases of the shifts of at least 3 visual features measured in 226. In some embodiments the degree of translation may be measured in terms of degree of rotation of the visual odometry device.

Figure 3:
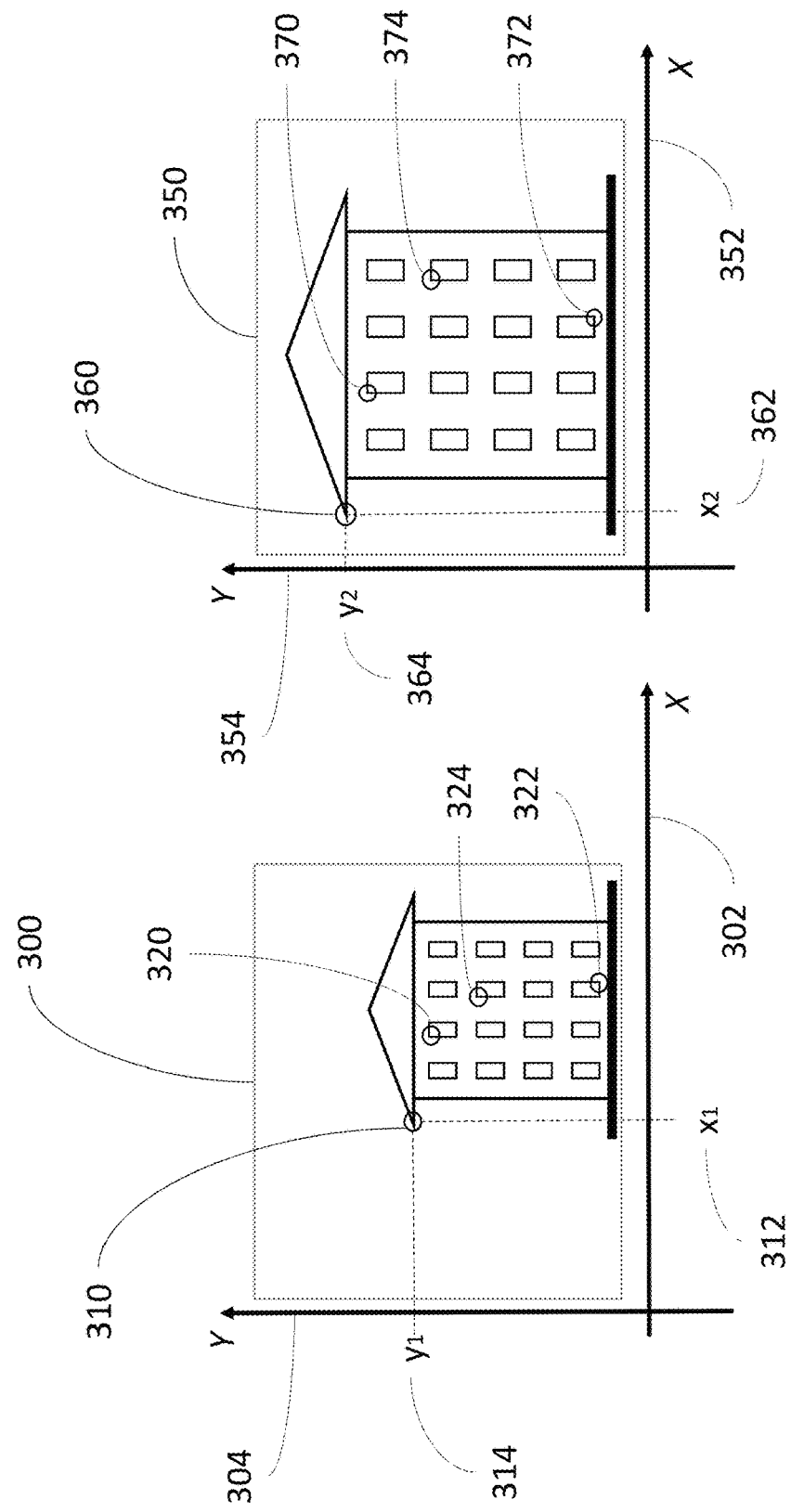
FIG. 3 shows an example of visual features identification and extraction as discussed in relation to the visual odometry method in FIG. 2.

FIG. 3 shows an example of visual features identification and extraction as discussed in relation to the visual odometry method 200 in FIG. 2. In FIG. 3, 300 represents an image of a building illustratively taken in process 222; similarly, 350 represents an image of the same building illustratively taken by process 222. Illustratively, the images may be taken at different times, wherein image 300 may be taken at a time $t_1$, while 350 may be taken at a time $t_2$, wherein $t_1$ is temporally before $t_2$. The same building is represented in both pictures, but at a different scale possibly because the visual odometry device may have moved in the timeframe between $t_1$ and $t_2$.

In FIG. 3, 302 represents the X-axis relative to image 300 and 304 represents the Y-axis relative to image 300. Similarly, 352 represents the X-axis relative to image 350 and 354 represents the Y-axis relative to image 350. The coordinate systems defined by 302, 304, 352, 354 are homogeneous.

Process 224 may extract at least one visual feature from image 300; for example, it may extract the visual feature 310, corresponding to the roof left corner, which has coordinates $x_1$, 312, and $y_1$, 314, with respect to the X, Y coordinate system 302, 304. Similarly, process 224 may extract at least one visual feature from image 350; for example, it may extract the visual feature 360, corresponding to the roof left corner, which has coordinates $x_2$, 362, and $y_2$, 364, with respect to the X, Y coordinate system 352, 354.

In process 226 of FIG. 2, the visual features 310 and 360 may be recognized as matching since the two visual features may relate to the depiction of the same object.

The points 320 and 322 as well as 370 and 372 represent additional exemplary visual features. It should be understood that other visual features may also be available in the exemplary images 300 and 350.

In some embodiments, the matching of visual features across images may be stochastic, therefore visual features matching is associated with a probability to be correct. In these embodiments, some matching may be faulty. An example of such faulty match may be a match between the visual features 324 and 374 which respectively refer to the upper corner of two different windows in the second upper window row of the building in the images 300 and 350. In these embodiments, faulty matches may result in an error that may lead to visual odometry estimate errors.

Figure 4:
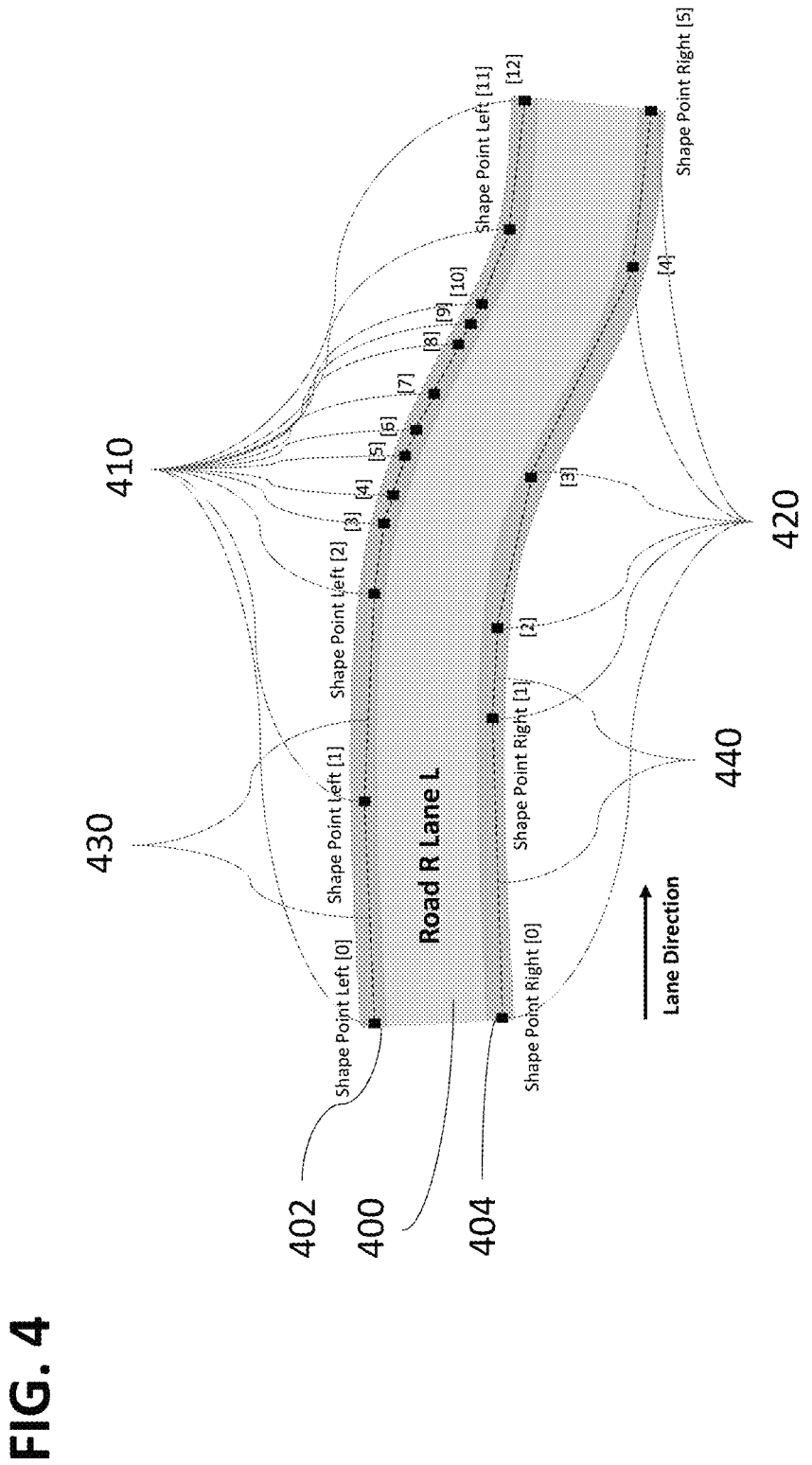
FIG. 4 shows an exemplary segment of a pathway 400 as it may be represented in an Automatic Driving (AD) 3D map.

FIG. 4 shows an exemplary segment of a pathway 400 as it may be represented in an Automatic Driving (AD) 3D map.

In an Automatic Driving (AD) 3D map, each pathway, like 400, has a boundary, as for example 402 or 404, and a pathway boundary is represented by shape points, as for example 430 and 440, and by polylines such as 430 or 440, connecting shape points 410 or 420. Shape points, polylines and other geometric objects in the map may be specified using an Earth-Cantered, Earth-Fixed ("ECEF") coordinates system, where points are uniquely identified by a longitude, a latitude and a height coordinate.

Shape points, in AD 3D maps, represent points in 3 dimensions whose position is defined by a longitude, a latitude and a high. Shape points 410 and 420 may be abstract points in the space or they may correspond to recognizable landmarks such as traffic signs, or objects on the side of the pathway.

Since shape points are represented in 3D, pathways and pathway boundaries in AD maps are also represented in three dimensions reflecting the up hills, and down hills of the terrain that they represent.

In some embodiments, a pathway may be a road, in other embodiments, a pathway may be a lane in the road. Embodiments of pathways may include the passing lane on a large road, the right turning lane, the left turning lane at an intersection, the lane turning towards a given destination, or the exiting lane of a highway. The pathway may be a road such as a highway, in other embodiments, it may be a street. A pathway may be any strip of land on which a vehicle can drive through. The pathway may not need to be based on land at all: a pathway may be a course through water for floating vehicles or submerged vehicles, in other embodiments it may be a course through air for flying drones or other types of flying vehicles.

Some points in the map are particularly important because they either identify the position of landmarks or because they are points that lay on the boundaries of roads and pathways. Examples of landmarks include road crossings, traffic signs, traffic lights, and in general objects that could be identified with a sensor such as the mono-camera monitoring the road.

Figure 5:
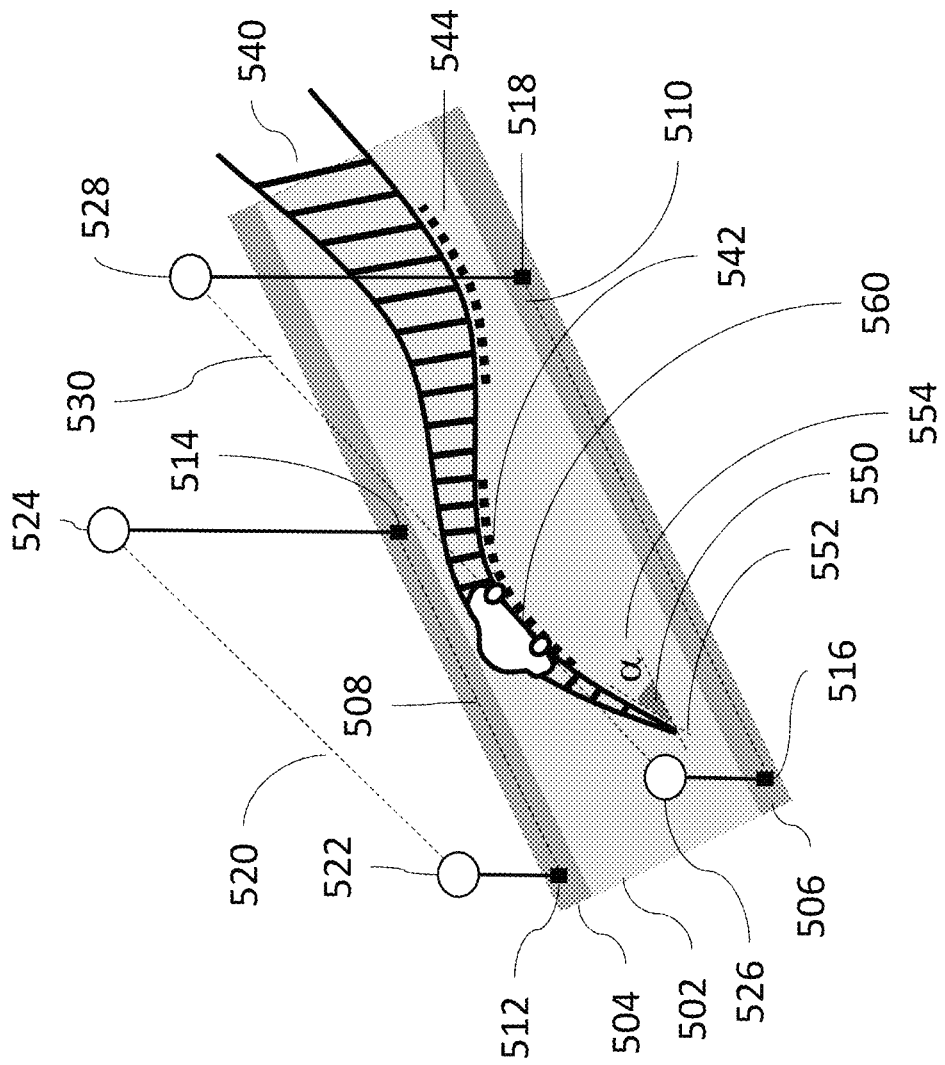
FIG. 5. shows the structure of a 3D map with a pathway, characterized by two-lane boundaries and a 3D curvature.

FIG. 5. shows the 3D structure of a 3D map with a pathway 502, characterized by two-lane boundaries: 504 and 506, and a 3D curvature 540.

The lane boundaries 504 and 506, are represented by polylines composed only of line 508, which is delimited by the two shape points 512 and 514, and line 510, that is delimited by the two shape points 516 and 518.

Whereas the pathway 502 and the boundaries 504 and 506 are illustrated on a flat surface, in reality, they may represent a pathway which has a vertical curvature with uphill and downhill areas. An exemplary illustration of such vertical curvature is shown through sign 540, which illustrates the wavy structure of the pathway, where 542 and 544 are indicators of the vertical curvature of the pathway.

This vertical curvature may be represented in the map through the height coordinate of the shape points. Specifically, the shape points 512, 514, 516, and 518 are 3D points which have a height dimension, as illustrated by the points 522, 524, 526, and 528.

Line 508 may be a sloping line in 3D, shown as line 520, between 522 and 524; similarly, line 510 may be a sloping line in 3D as shown by the segment 530 between 526 and 528.

In each point of the pathways has a pitch angle indicating the degree of the slope of the road in that position. An exemplary pitch angle $\alpha$ is represented in 550. The pitch angle $\alpha$ is delimited by line 554 representing an ideal flat ground level, and the slope represented by the line 552.

Given that the lane boundaries are modeled as polylines, the pathways with their vertical curvature may be modeled as clothoids; wherein clothoids provide a good approximation of the real roads under the assumption that roads are smooth surfaces.

The sign 560 represents the exemplary position of an imaginary vehicle on the pathway. Given the 3D shape of the pathway the position of the vehicle may be modeled by the vector (x,y,z) where x, y, and z are the coordinates with respect to an Earth-Cantered, Earth-Fixed ("ECEF") coordinates system.

Figure 6:
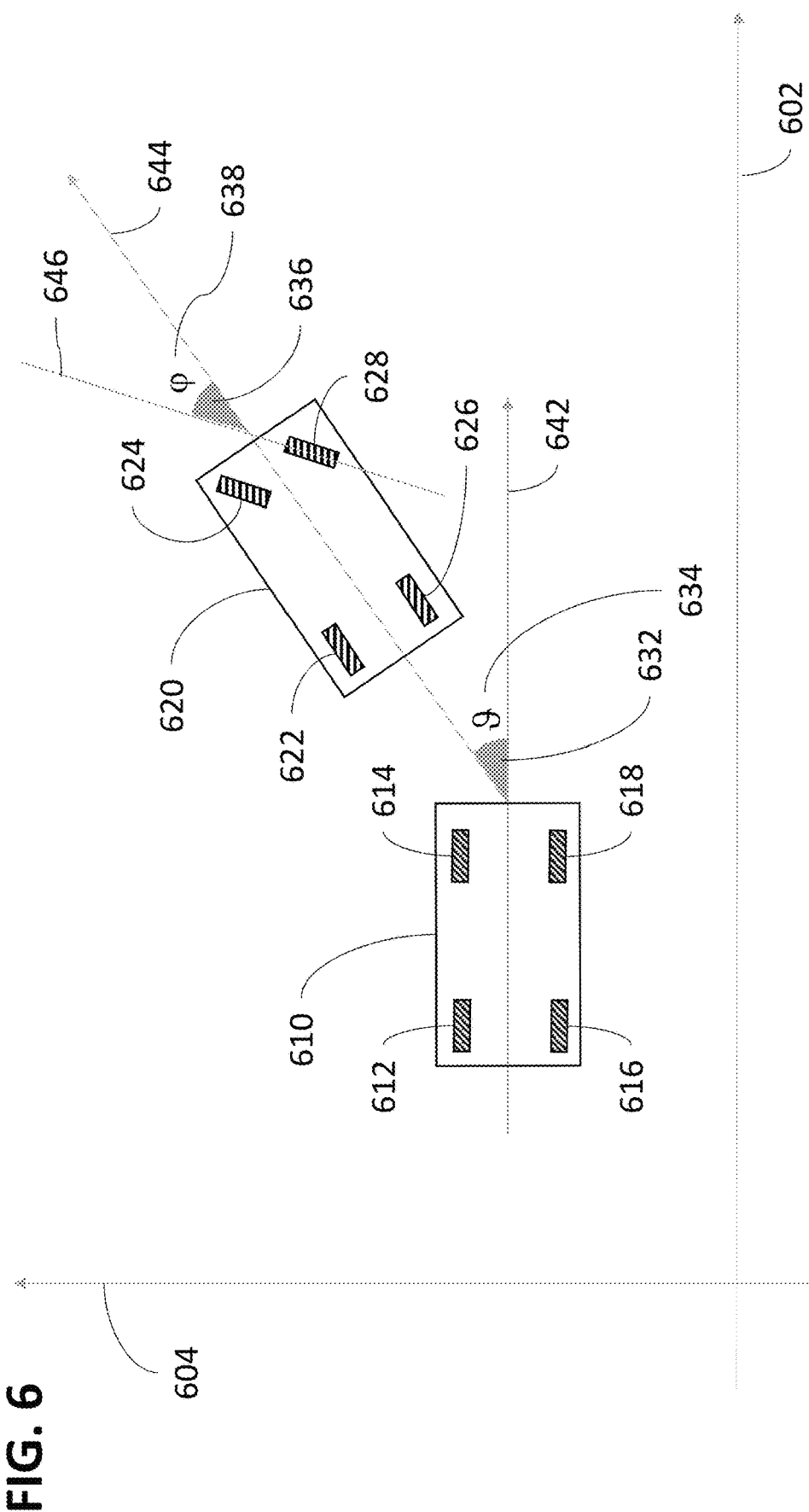
FIG. 6 shows a model of a vehicle that is rotating horizontally, on a flat surface.

FIG. 6 shows a model of a vehicle that is rotating horizontally, in other words turning, on a flat surface. In FIG. 6 line 602 represents the X-axis while line 604 represents the Y-axis, wherein the X and Y axes may be specified with respect to an ECEF coordinate system.

The reference numerals 610 and 620 may illustratively indicate the positions of a wheeled vehicle at two different time points; wherein the sign 610 may represent the position of the vehicle before starting the rotation, while sign 620 may represent a position of the vehicle during the rotation.

The reference numerals 612, 616, 614 and 618 may illustratively indicate the position of the wheels of the vehicle in the position indicated by reference numeral 610. Similarly, the reference numerals 622, 626, 624 and 628 may illustratively indicate the position of the wheels of the vehicle in the position indicated by reference numeral 620.

Line 642 illustratively represents the instantaneous direction of motion of vehicle in the position indicated by 610; line 644 illustratively represents the instantaneous direction of motion of vehicle in the position indicated by 620.

Angle 632 with label $\vartheta$, 634, delimited by the lines 644 and 642 illustratively shows the amount of horizontal rotation translation of the vehicle from position indicated by reference numeral 610 to the position indicated by reference numeral 620.

Line 646 shows the direction of the front wheels of the vehicle when in the position indicated by reference numeral 620, wherein it is assumed that both wheels may be in the same direction.

Angle 636 with label φ, 638, delimited by the lines 644 and 646 illustratively shows the amount of rotation of the front wheels of vehicle in the position indicated by reference sign 620.

The translation of the vehicle from the position indicated by reference numeral 610 to the position indicated by reference numeral 620 may be computed in accord with the following formula (1):

$$\vec{T} = \begin{bmatrix} \sin(\varphi) \\ \cos(\varphi) \\ 0 \end{bmatrix} \quad (1)$$

wherein:
φ indicates the wheels angle;
0 indicate no translation in the vertical direction.

In formula (1), $\vec{T}$ may be a translation vector, and an interpretation of formula (1) may be that the wheels angle determines the direction of the vehicle translation vector $\vec{T}$.

In some embodiments, vehicles wheels may turn with different angles; in these embodiments, the angle φ may be estimated with respect to the external wheel in the turn.

The rotation of the vehicle in the plane may be expressed according to the following formula (2):

$$R_P = \begin{bmatrix} \cos(\vartheta) & -\sin(\vartheta) & 0 \\ \sin(\vartheta) & \cos(\vartheta) & 0 \\ 0 & 0 & 1 \end{bmatrix} \quad (2)$$

wherein:
ϑ indicates the horizontal rotation angle.

In some embodiments, the angle ϑ may be called yaw angle.

Formulae (1) and (2) assume exclusively translations on a flat plane with no vertical translation.

Figure 7:
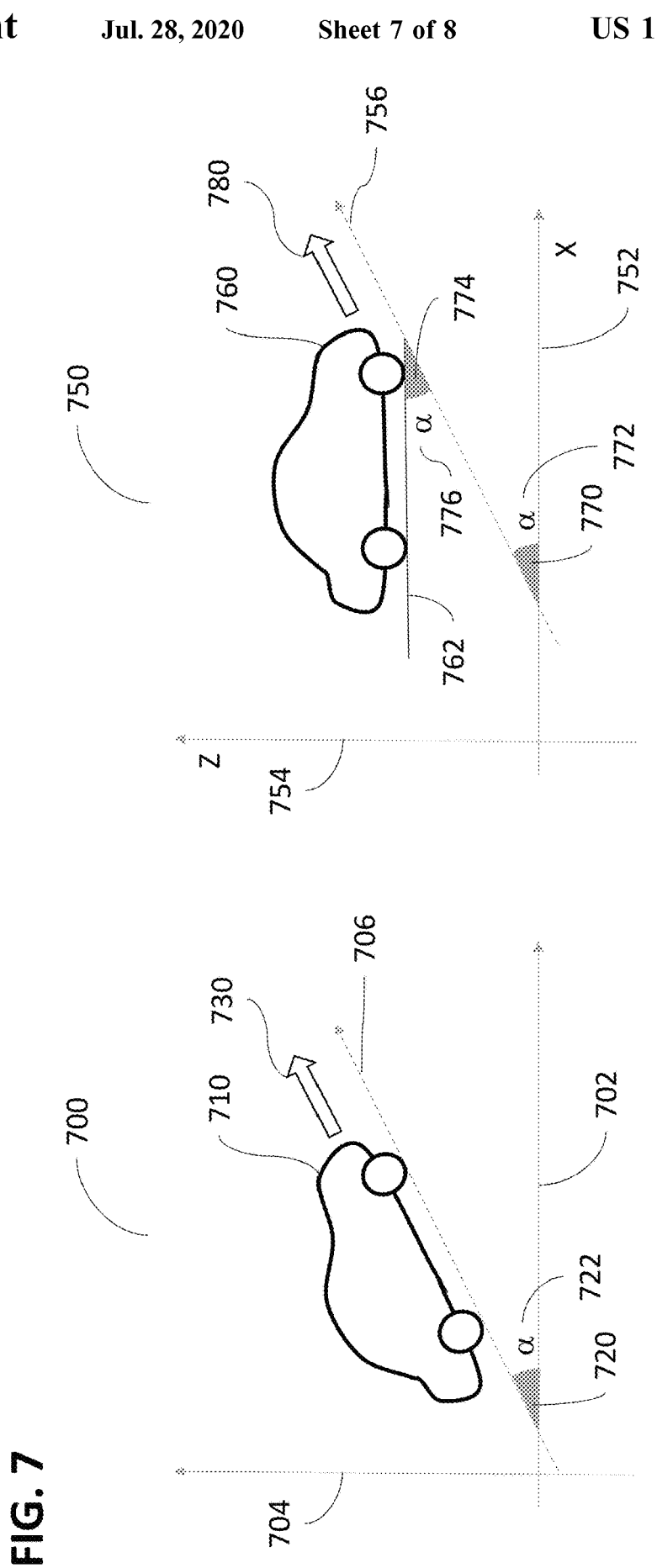
FIG. 7 shows two diagrams indicating two contrasting approaches to the modeling of vertical rotation.

FIG. 7 shows two diagrams indicating two contrasting approaches to the modeling of vertical rotation. The first diagram, 700, in which the vehicle is inclined to be parallel to the driving plane, the second diagram, 750, in which the vertical inclination is modeled as a piece-wise plane. In diagram 700, 702 represents one of the axes of the horizontal plane, exemplarily the X-axis, while 704 represents the vertical Z-axis. The X-axis and Z-axis may be defined in an ECEF coordinate system. Vehicle 710 illustratively rides in the direction indicated by the arrow 730 along a slope 706 which is at a pitch angle 720 labeled α 722 with respect to the horizontal plane. It has to be understood that the pitch angle may correspond to the vertical rotation performed by vehicle 710 when moving from the flat surface to the sloping surface.

Diagram 750 illustrates that the vertical inclination is modeled as a piece-wise plane in which the vehicle never leaves the horizontal driving plane, rather the horizontal driving plane moves up and down vertically along the inclined slope. The resulting direction of motion of vehicle 760 is indicated the arrow 780.

In diagram 750, the line 752 represent one of the axes of the horizontal plane, exemplarily the X-axis, while line 754 represents the vertical Z-axis. The X-axis and Z-axis may be defined in an ECEF coordinate system. The slope of the road, indicated by the line 756, is at a pitch angle 770, labeled α 772, with respect to the horizontal plane 752.

Vehicle 760 rides on a driving plane illustratively represented by line 762. Angle 774 between the line 762 describing the flat plane and the slope line 756 is labeled α 776. Angle 774 is geometrically equivalent to angle 720 therefore both angles are marked with the same label.

It should be understood that in FIG. 7, the axes 702 and 752 may be the same axes, similarly, the axes 704 and 754 may be the same axes. Furthermore, all angles labeled α may be the same angles or angles of equivalent dimensions.

In mathematical terms, the difference between 700 and 750 may be expressed as follows. In 700 translations of the vehicle 710 have to be modeled in three dimensions. In this case, the formulae (1) and (2) do not hold since they make an assumption of translations and rotations only on a flat surface. On the contrary, in 750, the translations of the vehicle are modelled to be always on a flat surface. In this case, the formulae (1) and (2) hold because their assumptions are satisfied; furthermore, the vertical movement of the plane on which the vehicle resides may be modelled independently of the horizontal rotations of the vehicle simplifying the mathematical model.

Under the piece-wise plane assumption, exemplified by 750, the vertical rotation may be modeled according to the following formula (3):

$$R_V = \begin{bmatrix} \cos(\alpha) & 0 & -\sin(\alpha) \\ 0 & 1 & 0 \\ \sin(\alpha) & 0 & \cos(\alpha) \end{bmatrix} \quad (3)$$

wherein:
α indicates the vertical rotation angle.

Based on (1), (2) and (3) it is possible to define the Essential matrix of the 3D rotation in terms of the matrix multiplication specified in the following formula (4):

$$E = T_X(R_P * R_V) = \begin{bmatrix} 0 & -\cos(\alpha - \vartheta) & 0 \\ \cos(\varphi - \vartheta) & 0 & \sin(\varphi - \vartheta) \\ 0 & \sin(\alpha + \vartheta) & 0 \end{bmatrix} \quad (4)$$

wherein:
α indicates the angle of vertical rotation;
ϑ indicates the horizontal rotation angle;
φ indicates the rotation angle of the wheels;
$T_X$ is the matrix representation of the cross product with $\vec{T}$.

The Essential matrix E may need to satisfy the following perspective geometry constraint:

$$\vec{X}_1^T * E * \vec{X}_2 = 0 \quad (5)$$

wherein
$\vec{X}_1$ is a translated coordinates vector indicating the position of a visual feature in a first image;
$\vec{X}_2$ is a coordinates vector indicating the position of the same visual feature in a second image;
E is the essential matrix as defined in formula (4).

A solution of formula (5) with respect to the rotation angles α, ϑ, φ provides the degrees of rotation translation of the vehicle from which the images were taken.

Formula (5) can be re-defined as a function of α, ϑ, φ as in the following formula (6):

$$f(\alpha,\vartheta,\varphi)=x_2 y_1 \cos(\varphi-\vartheta)-x_1 y_2 \cos(\alpha-\vartheta)+\sin(\alpha+\vartheta)+y_1 \sin(\varphi-\vartheta)=0 \qquad (6)$$

wherein
$x_1$ indicates the X coordinate of the visual feature in the first image;
$y_1$ indicates the Y coordinate of the visual feature in the first image;
$x_2$ indicates the X coordinate of the visual feature in the second image;
$y_2$ indicates the Y coordinate of the visual feature in the second image;
α indicates the angle of vertical rotation;
ϑ indicates the horizontal rotation angle;
φ indicates the rotation angle of the wheels.

Formula (6) may be re-written as the following formula (7):

$$f(\alpha, \vartheta, \varphi) = [a_1, a_2, a_3, a_4] * \begin{bmatrix} x_2 y_1 \\ -x_1 y_2 \\ 1 \\ y_1 \end{bmatrix} = 0 \qquad (7)$$

wherein
$x_1$ indicates the X coordinate of the visual feature in the first image;
$y_1$ indicates the Y coordinate of the visual feature in the first image;
$x_2$ indicates the X coordinate of the visual feature in the second image;
$y_2$ indicates the Y coordinate of the visual feature in the second image;
$a_1 = \cos(\varphi-\vartheta)$;
$a_2 = \cos(\alpha-\vartheta)$;
$a_3 = \sin(\varphi+\vartheta)$;
$a_4 = \sin(\alpha-\vartheta)$.

Usually, images taken by the image sensors include a large number of visual features, many of which matching. In some cases, the large number of matches may lead to a considerable computation effort. The reformulation of formula (5) in formula (7) may be solved efficiently with factorization methods leading to a reduced computational effort.

The Essential matrix, in its general form, may be characterized by a translation with 6 degrees of freedom corresponding to three translations along the axes, and three rotations along the axes. Mathematically, the degrees of freedom of an Essential matrix may be reduced to 5. In such cases, the calculation of the Essential matrix requires at least 5 matching visual features across different images.

In contrast, the Essential matrix, as defined in (4) and reformulated in (7), requires only three degrees of freedom resulting in a three variables function.

The reduction of degrees of freedom is the result of two assumptions. The first one is the modeling of vertical inclination is as a piece-wise plane. Under this assumption, the vehicle is always on a horizontal plane as shown illustratively in FIG. 7 and mathematically in formula (3).

The second assumption is that the vehicle does not roll with respect to the direction of motion.

Figure 8:
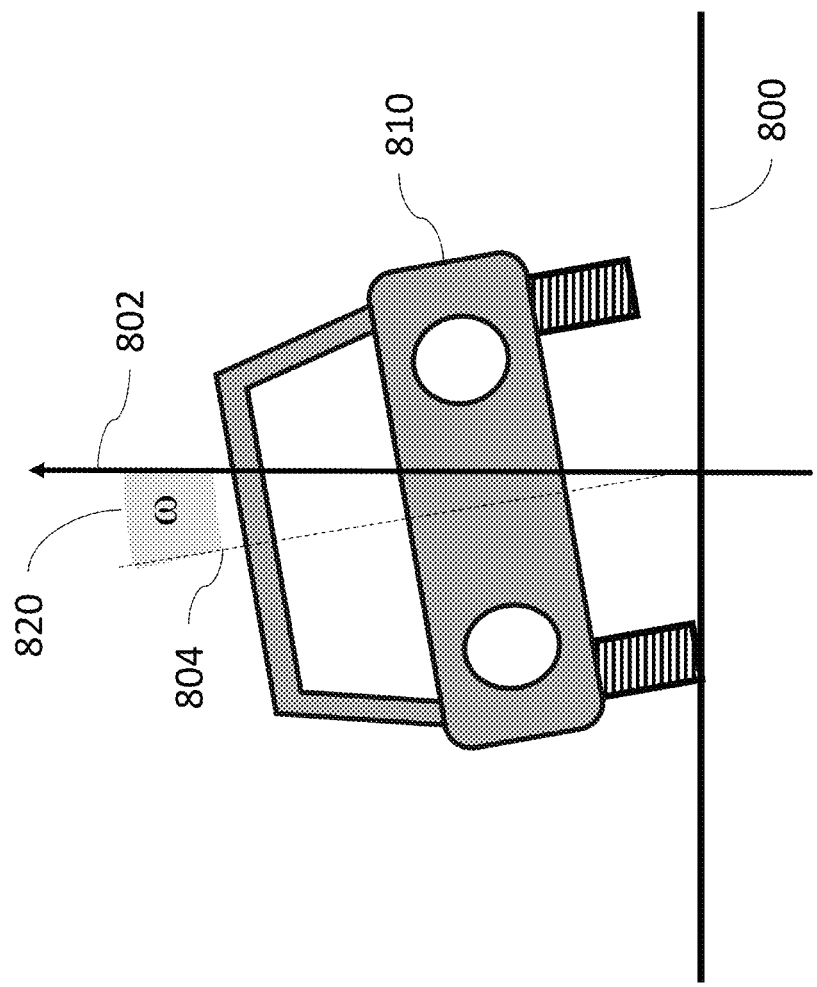
FIG. 8 shows an example of vehicle roll and of a rolling angle.

FIG. 8 shows an example of vehicle roll and of a rolling angle 820. In FIG. 8, a vehicle 810 rides on a pathway, exemplarily a road, whose surface may be illustratively represented by the line 800; line 802 represents the vertical axis with respect to the pathway, while the vertical axis of the vehicle is represented as 804. Due to the roll of vehicle 810, the vertical axes 804 of vehicle 810 does not correspond to the vertical axis 802 of the road. The angle 820 delimited by the two axes 804 and 802 may be defined as the rolling angle of vehicle 810.

In equations (1) to (7), the rolling angle is not considered. Mathematically, this may be equivalent to assuming that the rolling angle is 0, or formally: ω=0.

The reduction of degrees of freedom resulting from the two assumptions of the modeling of vertical inclination is as a piece-wise plane and of a rolling angle ω=0, lead to a reduced number of visual features that are required to perform the visual odometry to three instead of five.

The reduction of the required matches may advantageously lead to a faster visual odometry process in which with a reduced image processing; furthermore, in embodiments in which the features matching across pictures may be faulty, the reduced number of pictures required may lead to an increase of localization accuracy.

In addition, the reduction of degrees of freedom may improve the precision of the motion estimation since less points may be needed to estimate the motion of a vehicle.

In the following, various examples are provided with reference to the aspects described above.

Example 1 is a visual odometry device, including: an image sensor configured to provide a first image and a second image; a visual feature extractor configured to extract at least three visual features corresponding to each of the first image and the second image; and a position determiner, configured to determine a change of a position of the at least three visual features between the first image and the second image, and to determine a degree of translation of the visual odometry device based on the determined change of position.

In example 2, the subject matter of example 1 may optionally include that a visual feature corresponds to an edge or an object or a corner in an image.

In example 3, the subject matter of examples 1 or 2 may optionally include that the first and second image represent portions of a 3D space; that the visual feature may correspond to position in the 3D space; and that corresponding visual features correspond to the same position in the 3D space.

In example 4, the subject matter of any one of examples 1 to 3 may optionally include that the visual feature extractor is further configured to extract at least three visual features corresponding to each of the first image and the second image; and that each visual feature corresponding to the first image corresponds to a visual feature in the second image.

In example 5, the subject matter of any one of examples 1 to 4 may optionally include that the position determiner is further configured to exclude a change of position based on roll.

In example 6, the subject matter of any one of examples 1 to 5 may optionally include that the position determiner is further configured to exclude a change of position based on vertical rotation of the visual odometry device.

In example 7, the subject matter of any one of examples 1 to 6 may optionally include that a degree of translation of the odometry device is determined by the change of position each one of the corresponding visual features specifies In example 8, the subject matter of any one of examples 1 to 7 may optionally include that the degree of translation of the visual odometry device is determined with the following formula:

$$\vec{X}_1^T * E * \vec{X}_2 = 0$$

wherein:

$\vec{X}_1$ indicates a coordinate vector indicating the position of a visual feature in a first image;

$\vec{X}_2$ indicates a coordinate vector indicating the position of the visual feature in a second image; and E indicates an Essential Matrix.

In example 9. the subject matter of any one of examples 1 to 8 may optionally include that the Essential Matrix is defined in terms of one translation, a vertical rotation, and a horizontal rotation.

In example 10. the subject matter of any one of examples 1 to 9 may optionally include that the essential matrix is computed in accordance with the following formula $$E = T_x(R_p * R_V)$$

wherein:

$T_x$ indicates a matrix representation of the cross product with a translation vector;

$R_p$ indicates a matrix specifying a degree of horizontal rotation;

$R_V$ indicates a matrix specifying a degree of vertical rotation.

In example 11. the subject matter of any one of examples 8 to 10 may optionally include that the translator vector specifies a degree of angular rotation.

In example 12. the subject matter of any one of examples 8 to 11 may optionally include that the degrees of angular rotation of the translation vector is computed with the following formula $$\vec{T} = \begin{bmatrix} \sin(\varphi) \\ \cos(\varphi) \\ 0 \end{bmatrix}$$

wherein $\varphi$ indicates the wheels angle.

In example 13 the subject matter of any one of examples 8 to 12 may optionally include that the degree of horizontal rotation is computed with the following formula $$R_p = \begin{bmatrix} \cos(\vartheta) & \sin(\vartheta) & 0 \\ -\sin(\vartheta) & \cos(\vartheta) & 0 \\ 0 & 0 & 1 \end{bmatrix}$$

wherein $\vartheta$ indicates a horizontal rotation angle.

In example 14 the subject matter of any one of examples 8 to 13 may optionally include that the degree of vertical rotation is defined by the following matrix $$R_v = \begin{bmatrix} \cos(\alpha) & 0 & -\sin(\alpha) \\ 0 & 1 & 0 \\ \sin(\alpha) & 0 & \cos(\alpha) \end{bmatrix}$$

wherein $\alpha$ indicates a vertical rotation angle.

In example 15 the subject matter of any one of examples 8 to 14 may optionally include that the essential matrix is expressed in accordance with the following formula $$[a_1 \quad a_2 \quad a_3 \quad a_4] * \begin{bmatrix} X_2 * Y_1 \\ -X_1 * Y_2 \\ 1 \\ 0 \end{bmatrix} = 0$$

wherein:

$a_1 = \cos(\varphi - \vartheta)$;

$a_2 = \cos(\alpha - \vartheta)$;

$a_3 = \sin(\alpha - \vartheta)$;

$a_4 = \cos(\varphi - \vartheta)$;

$\varphi$ indicates the wheels angle;

$\vartheta$ indicates a horizontal rotation angle;

$\alpha$ indicates a vertical rotation angle;

$(X_1, Y_1)$ indicates the coordinates of a visual feature in a first image; and $(X_2, Y_2)$ indicates the coordinates of the same visual feature in a second image.

In example 16. the subject matter of example 15 may optionally include that the essential matrix is computed with a factorization method.

Example 17. is a visual odometry method, including: providing a first image and a second image; extracting at least three visual features corresponding to each of the first image and the second image; and determining a change of a position of the at least three visual features between the first image and the second image, and to determine a degree of translation of the visual odometry device based on the determined change of position of the at least three visual features.

In example 18. the subject matter of example 17 may optionally include that a visual feature corresponds to an edge or an object or a corner in an image.

In example 19. the subject matter of example 17 or 18 may optionally include that the first and second image represent portions of a 3D space; that the visual feature corresponds to position in the 3D space; and that corresponding visual features correspond to the same position in the 3D space.

In example 20. the subject matter of any one of examples 17 to 19 may optionally include that extracting at least three visual features includes extracting at least three visual features corresponding to each of the first image and the second image; and that each visual feature corresponding to the first image corresponds to a visual feature in the second image.

In example 21. the subject matter of any one of examples 17 to 20 may optionally include that determining a change of a position further includes to exclude a change of position based on roll.

In example 22. the subject matter of any one of examples 17 to 21 may optionally include that determining a change of a position further includes to exclude a change of position based on vertical rotation of the visual odometry device.

In example 23. the subject matter of any one of examples 17 to 22 may optionally include that a degree of translation of the odometry device is determined by the change of position each one of the corresponding visual features specifies In example 24. the subject matter of any one of examples 17 to 23 may optionally include that the degree of translation of the visual odometry device is determined with the following formula:

$$\vec{X}_1^T * E * \vec{X}_2 = 0$$

wherein $\vec{X}_1$ indicates a coordinate vector indicating the position of a visual feature in a first image;

$\vec{X}_2$ indicates a coordinate vector indicating the position of the visual feature in a second image; and E indicates an Essential Matrix.

In example 25. the subject matter of any one of examples 17 to 24 may optionally include that the Essential Matrix is defined in terms of one translation, a vertical rotation, and a horizontal rotation.

In example 26. the subject matter of any one of examples 17 to 25 may optionally include that the essential matrix is computed in accordance with the following formula $$E = T_x (R_p * R_V)$$

wherein $T_x$ indicates a matrix representation of the cross product with a translation vector;

$R_p$ indicates a matrix specifying a degree of horizontal rotation;

$R_V$ indicates a matrix specifying a degree of vertical rotation.

In example 27. the subject matter of any one of examples 24 to 26 may optionally include that the translator vector specifies a degree of angular rotation.

In example 28. the subject matter of any one of examples 24 to 27 may optionally include that the degrees of angular rotation of the translation vector is computed with the following formula $$\vec{T} = \begin{bmatrix} \sin(\varphi) \\ \cos(\varphi) \\ 0 \end{bmatrix}$$

wherein $\varphi$ indicates the wheels angle.

In example 29. the subject matter of any one of examples 24 to 28 may optionally include that the degree of horizontal rotation is computed with the following formula $$R_p = \begin{bmatrix} \cos(\vartheta) & \sin(\vartheta) & 0 \\ -\sin(\vartheta) & \cos(\vartheta) & 0 \\ 0 & 0 & 1 \end{bmatrix}$$

wherein $\vartheta$ indicates a horizontal rotation angle.

In example 30. the subject matter of any one of examples 24 to 29 may optionally include that the degree of vertical rotation is defined by the following matrix $$R_v = \begin{bmatrix} \cos(\alpha) & 0 & -\sin(\alpha) \\ 0 & 1 & 0 \\ \sin(\alpha) & 0 & \cos(\alpha) \end{bmatrix}$$

wherein $\alpha$ indicates a vertical rotation angle.

In example 31. the subject matter of any one of examples 24 to 30 may optionally include that the essential matrix is expressed in accordance with the following formula:

$$[a_1 \quad a_2 \quad a_3 \quad a_4] * \begin{bmatrix} X_2 * Y_1 \\ -X_1 * Y_2 \\ 1 \\ 0 \end{bmatrix} = 0$$

wherein:

$a_1 = \cos(\varphi - \vartheta)$;
$a_2 = \cos(\alpha - \vartheta)$;
$a_3 = \sin(\alpha - \vartheta)$;
$a_4 = \cos(\varphi - \vartheta)$;
$\varphi$ indicates the wheels angle;
$\vartheta$ indicates a horizontal rotation angle;
$\alpha$ is a vertical rotation angle;
$(X_1, Y_1)$ indicates the coordinates of a visual feature in a first image; and
$(X_2, Y_2)$ indicates the coordinates of the same visual feature in a second image.

In example 32. the subject matter of example 31 may optionally include that the essential matrix is computed with a factorization method.

Example 33. is a vehicle including a visual odometry device, including: an image sensor configured to provide a first image and a second image; a visual feature extractor configured to extract at least three visual features corresponding to each of the first image and the second image; and a position determiner, configured to determine a change of a position of the at least three visual features between the first image and the second image, and to determine a degree of translation of a visual odometry method based on the determined change of position of the at least three visual features.

In example 34. the subject matter of example 33 may optionally include that the visual odometry device is rigidly attached to the vehicle, pointing in the direction of motion of vehicle.

In example 35. the subject matter of any one of examples 33 or 34 may optionally include that the image sensor is a mono-camera.

In example 36. the subject matter of any one of examples 33 to 35 may optionally include that the image sensor is configured to point in the direction of motion of the vehicle.

In example 37. the subject matter of any one of examples 33 to 36 may optionally include that a visual feature corresponds to an edge or an object or a corner in an image.

In example 38. the subject matter of any one of examples 33 to 37 may optionally include that the first and second image represent portions of a 3D space; that the visual feature corresponds to position in the 3D space; and that corresponding visual features correspond to the same position in the 3D space.

In example 39. the subject matter of any one of examples 33 to 38 may optionally include that the visual feature extractor is further configured to extract at least three visual features corresponding to each of the first image and the second image; and that each visual feature corresponding to the first image corresponds to a visual feature in the second image.

In example 40. the subject matter of any one of examples 33 to 39 may optionally include that the position determiner is further configured to exclude a change of position based on roll.

In example 41. the subject matter of any one of examples 33 to 40 may optionally include that the position determiner is further configured to exclude a change of position based on vertical rotation of the visual odometry device.

In example 42. the subject matter of any one of examples 33 to 41 may optionally include that a degree of translation of the odometry device is determined by the change of position each one of the corresponding visual features specifies In example 43. the subject matter of any one of examples 33 to 42 may optionally include that the degree of translation of the visual odometry device is determined with the following formula:

$$\vec{X}_1^T * E * \vec{X}_2 = 0$$

wherein $\vec{X}_1$ is a coordinate vector indicating the position of a visual feature in a first image;

$\vec{X}_2$ is a coordinate vector indicating the position of the visual feature in a second image;

E is an Essential Matrix.

In example 44. the subject matter of any one of examples 33 to 43 may optionally include that the Essential Matrix is defined in terms of one translation, a vertical rotation, and a horizontal rotation.

In example 45. the subject matter of any one of examples 33 to 44 may optionally include that the essential matrix is computed in accordance with the following formula $$E = T_x(R_P * R_V)$$

wherein $T_x$ indicates a matrix representation of the cross product with a translation vector;

$R_P$ indicates a matrix specifying a degree of horizontal rotation;

$R_V$ indicates a matrix specifying a degree of vertical rotation.

In example 46. the subject matter of any one of examples 43 to 45 may optionally include that the translator vector specifies a degree of angular rotation.

In example 47. the subject matter of any one of examples 43 to 46 may optionally include that the degrees of angular rotation of the translation vector is computed with the following formula $$\vec{T} = \begin{bmatrix} \sin(\varphi) \\ \cos(\varphi) \\ 0 \end{bmatrix}$$

wherein $\varphi$ indicates the wheels angle.

In example 48. the subject matter of any one of examples 43 to 47 may optionally include that the degree of horizontal rotation is computed with the following formula $$R_p = \begin{bmatrix} \cos(\vartheta) & \sin(\vartheta) & 0 \\ -\sin(\vartheta) & \cos(\vartheta) & 0 \\ 0 & 0 & 1 \end{bmatrix}$$

wherein $\vartheta$ indicates a horizontal rotation angle.

In example 49. the subject matter of any one of examples 43 to 48 may optionally include that the degree of vertical rotation is defined by the following matrix $$R_v = \begin{bmatrix} \cos(\alpha) & 0 & -\sin(\alpha) \\ 0 & 1 & 0 \\ \sin(\alpha) & 0 & \cos(\alpha) \end{bmatrix}$$

wherein $\alpha$ indicates a vertical rotation angle.

In example 50. the subject matter of any one of examples 43 to 49 may optionally include that the essential matrix is expressed in accordance with the following formula $$[a_1 \ a_2 \ a_3 \ a_4] * \begin{bmatrix} X_2 * Y_1 \\ -X_1 * Y_2 \\ 1 \\ 0 \end{bmatrix} = 0$$

wherein:

$a_1 = \cos(\varphi - \vartheta)$;
$a_2 = \cos(\alpha - \vartheta)$;
$a_3 = \sin(\alpha - \vartheta)$;
$a_4 = \cos(\varphi - \vartheta)$;
$\varphi$ indicates the wheels angle;
$\vartheta$ indicates a horizontal rotation angle;
$\alpha$ indicates a vertical rotation angle;
$(X_1, Y_1)$ indicates the coordinates of a visual feature in a first image; and
$(X_2, Y_2)$ indicates the coordinates of the same visual feature in a second image.

In example 51. the subject matter of example 50 may optionally include that the essential matrix is computed with a factorization method.

Example 52. is a non-transient computer readable medium including a plurality of instructions configured to, when carried out by one or more processors, implement a method, the method including: providing a first image and a second image; extracting at least three visual features corresponding to each of the first image and the second image; and determining a change of a position of the at least three visual features between the first image and the second image, and to determine a degree of translation of the visual odometry device based on the determined change of position of the at least three visual features.

In example 54. the subject matter of example 52 may optionally include that a visual feature corresponds to an edge or an object or a corner in an image.

In example 55. the subject matter of any one of examples 52 or 54 may optionally include that the first and second image represent portions of a 3D space; that the visual feature corresponds to position in the 3D space; and that corresponding visual features correspond to the same position in the 3D space.

In example 56. the subject matter of any one of examples 52 to 55, that extracting at least three visual features includes extracting at least three visual features corresponding to each of the first image and the second image; and that each visual feature corresponding to the first image corresponds to a visual feature in the second image.

In example 57. the subject matter of any one of examples 52 to 56 may optionally include that determining a change of a position further includes to exclude a change of position based on roll.

In example 58. the subject matter of any one of examples 52 to 57, may optionally include that determining a change of a position further includes to exclude a change of position based on vertical rotation of the visual odometry device.

In example 59. the subject matter of any one of examples 52 to 58 may optionally include that a degree of translation of the odometry device is determined by the change of position each one of the corresponding visual features specifies In example 60. the subject matter of any one of examples 52 to 59 may optionally include that the degree of translation of the visual odometry device is determined with the following formula:

$$\vec{X}_1^T * E * \vec{X}_2 = 0$$

wherein $\vec{X}_1$ indicates a coordinate vector indicating the position of a visual feature in a first image;

$\vec{X}_2$ indicates a coordinate vector indicating the position of the visual feature in a second image; and E indicates an Essential Matrix.

In example 61. the subject matter of any one of examples 52 to 60 may optionally include that the Essential Matrix is defined in terms of one translation, a vertical rotation, and a horizontal rotation.

In example 62. the subject matter of any one of examples 52 to 61 may optionally include that the essential matrix is computed in accordance with the following formula $$E = T_x(R_p * R_V)$$

wherein $T_x$ indicates a matrix representation of the cross product with a translation vector;

$R_p$ indicates a matrix specifying a degree of horizontal rotation;

$R_V$ indicates a matrix specifying a degree of vertical rotation.

In example 63. the subject matter of any one of examples 60 to 62 may optionally include that the translator vector specifies a degree of angular rotation.

In example 64. the subject matter of any one of examples 60 to 63 may optionally include that the degrees of angular rotation of the translation vector is computed with the following formula $$\vec{T} = \begin{bmatrix} \sin(\varphi) \\ \cos(\varphi) \\ 0 \end{bmatrix}$$

wherein $\varphi$ indicates a wheels angle.

In example 65. the subject matter of any one of examples 60 to 64 may optionally include that the degree of horizontal rotation is computed with the following formula $$R_p = \begin{bmatrix} \cos(\vartheta) & \sin(\vartheta) & 0 \\ -\sin(\vartheta) & \cos(\vartheta) & 0 \\ 0 & 0 & 1 \end{bmatrix}$$

wherein $\vartheta$ indicates a horizontal rotation angle.

In example 66. the subject matter of any one of examples 60 to 65 may optionally include that the degree of vertical rotation is defined by the following matrix $$R_v = \begin{bmatrix} \cos(\alpha) & 0 & -\sin(\alpha) \\ 0 & 1 & 0 \\ \sin(\alpha) & 0 & \cos(\alpha) \end{bmatrix}$$

wherein $\alpha$ indicates a vertical rotation angle.

In example 67. the subject matter of any one of examples 60 to 66 may optionally include that the essential matrix is expressed in accordance with the following formula $$[a_1 \quad a_2 \quad a_3 \quad a_4] * \begin{bmatrix} X_2 * Y_1 \\ -X_1 * Y_2 \\ 1 \\ 0 \end{bmatrix} = 0$$

wherein:
$a_1 = \cos(\varphi - \vartheta)$;
$a_2 = \cos(\alpha - \vartheta)$;
$a_3 = \sin(\alpha - \vartheta)$;
$a_4 = \cos(\varphi - \vartheta)$;
$\varphi$ indicates the wheels angle;
$\vartheta$ indicates a horizontal rotation angle;
$\alpha$ indicates a vertical rotation angle;
$(X_1, Y_1)$ are the coordinates of a visual feature in a first image; and
$(X_2, Y_2)$ are the coordinates of the same visual feature in a second image.

In example 68. the subject matter of example 67 may optionally include that the essential matrix is computed with a factorization method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A visual odometry device, comprising one or more processors configure to:
   extract at least three corresponding visual features from each of first image and a second image; and
   model a vertical rotation of the visual odometry device as a horizontal plane changing a vertical position along an inclined slope;
   determine a change of a position of the at least three visual features between the first image and the second image based on the vertical rotation; and
   determine a degree of translation of the visual odometry device based on the determined change of position.

2. The visual odometry device of claim 1,
   wherein a visual feature corresponds to an edge or an object or a corner in an image.

3. The visual odometry device of claim 1,
   wherein each visual feature corresponding to the first image corresponds to a visual feature in the second image.

4. The visual odometry device of claim 1,
further configured to set a default horizontal rotation angle to zero and determine the change of a position based on the default horizontal rotation angle.

5. The visual odometry device of claim 1,
wherein a degree of translation of the odometry device is determined by the change of position each one of the corresponding visual features specifies.

6. The visual odometry device of claim 1,
wherein the degree of translation of the visual odometry device is determined with the following formula:

$$\vec{X}_1^T * E * \vec{X}_2 = 0$$

wherein $\vec{X}_1^T$ is a coordinate vector indicating the position of a visual feature in a first image;

$\vec{X}_2$ is a coordinate vector indicating the position of the visual feature in a second image; and E is an Essential Matrix.

7. The visual odometry device of claim 1,
wherein the model of the vertical rotation is determined by:
estimating a pitch angle; and
setting the horizontal plane at the pitch angle relative to the inclined slope.

8. A vehicle comprising one or more processors configured to:
extract at least three corresponding visual features from each of a first image and a second image; and
model a vertical rotation of the vehicle as a horizontal plane rising or falling along an inclined slope;
determine a change of a position of the at least three visual features between the first image and the second image based on the vertical rotation; and
determine a degree of translation of a visual odometry method based on the determined change of position of the at least three visual features.

9. The vehicle of claim 8,
wherein the visual odometry device is rigidly attached to the vehicle, pointing in the direction of motion of the vehicle.

10. The vehicle of claim 8,
further comprising an image sensor, wherein the image sensor is a mono-camera.

11. The vehicle of claim 8,
wherein a visual feature corresponds to an edge or an object or a corner in an image.

12. The vehicle of claim 8,
wherein the first and second image represent portions of a 3D space;
wherein the visual features correspond to positions in the 3D space;
wherein corresponding visual features correspond to the same position in the 3D space.

13. The vehicle of claim 8,
further configured to set a default horizontal rotation angle to zero and determine the change of a position based on the default horizontal rotation angle.

14. The visual odometry device of claim 7,
wherein the model of the vertical rotation is a substitute for a pitch measurement.

15. A non-transitory computer readable medium comprising a plurality of instructions configured to, when carried out by one or more processors, implement a method, the method comprising:
extracting at least three visual corresponding features from each of a first image and a second image;
modelling a vertical rotation as a horizontal plane changing a vertical position along an inclined slope;
determining a change of a position of the at least three visual features between the first image and the second image based on the vertical rotation; and
determining a degree of translation of the visual odometry device based on the determined change of position of the at least three visual features.

16. The non-transitory computer readable medium of claim 15,
wherein a visual feature corresponds to an edge or an object or a corner in an image.

17. The non-transitory computer readable medium of claim 15,
wherein the first and second image represent portions of a 3D space;
wherein the visual features correspond to positions in the 3D space;
wherein corresponding visual features correspond to the same position in the 3D space.

18. The non-transitory computer readable medium of claim 15,
wherein each visual feature corresponding to the first image corresponds to a visual feature in the second image.

19. The non-transitory computer readable medium of claim 15,
further comprises setting a default horizontal rotation angle to zero and determining the change of a position based on the default horizontal rotation angle.

20. The vehicle of claim 8,
wherein the inclined slope is based on an elevation change of a surface.

* * * * *